Oct. 31, 1944.   C. B. DOTY   2,361,609
WINDOW ASSEMBLY FOR VEHICLE BODIES
Filed Nov. 4, 1941   4 Sheets-Sheet 1

INVENTOR
Clifford B. Doty.
BY
Gray and Smith
ATTORNEYS.

Oct. 31, 1944.   C. B. DOTY   2,361,609
WINDOW ASSEMBLY FOR VEHICLE BODIES
Filed Nov. 4, 1941   4 Sheets-Sheet 2
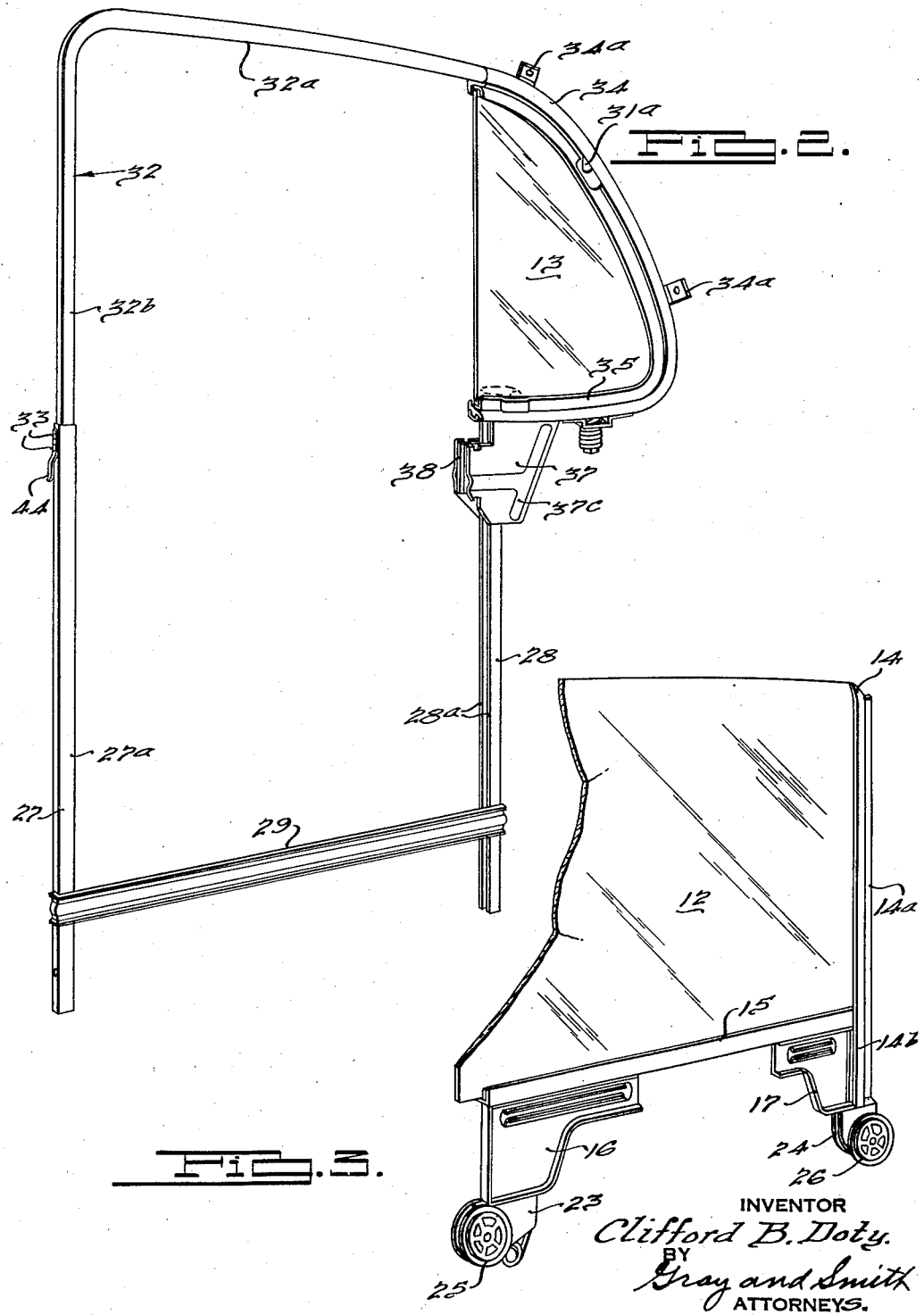
INVENTOR
Clifford B. Doty.
BY
Gray and Smith
ATTORNEYS.

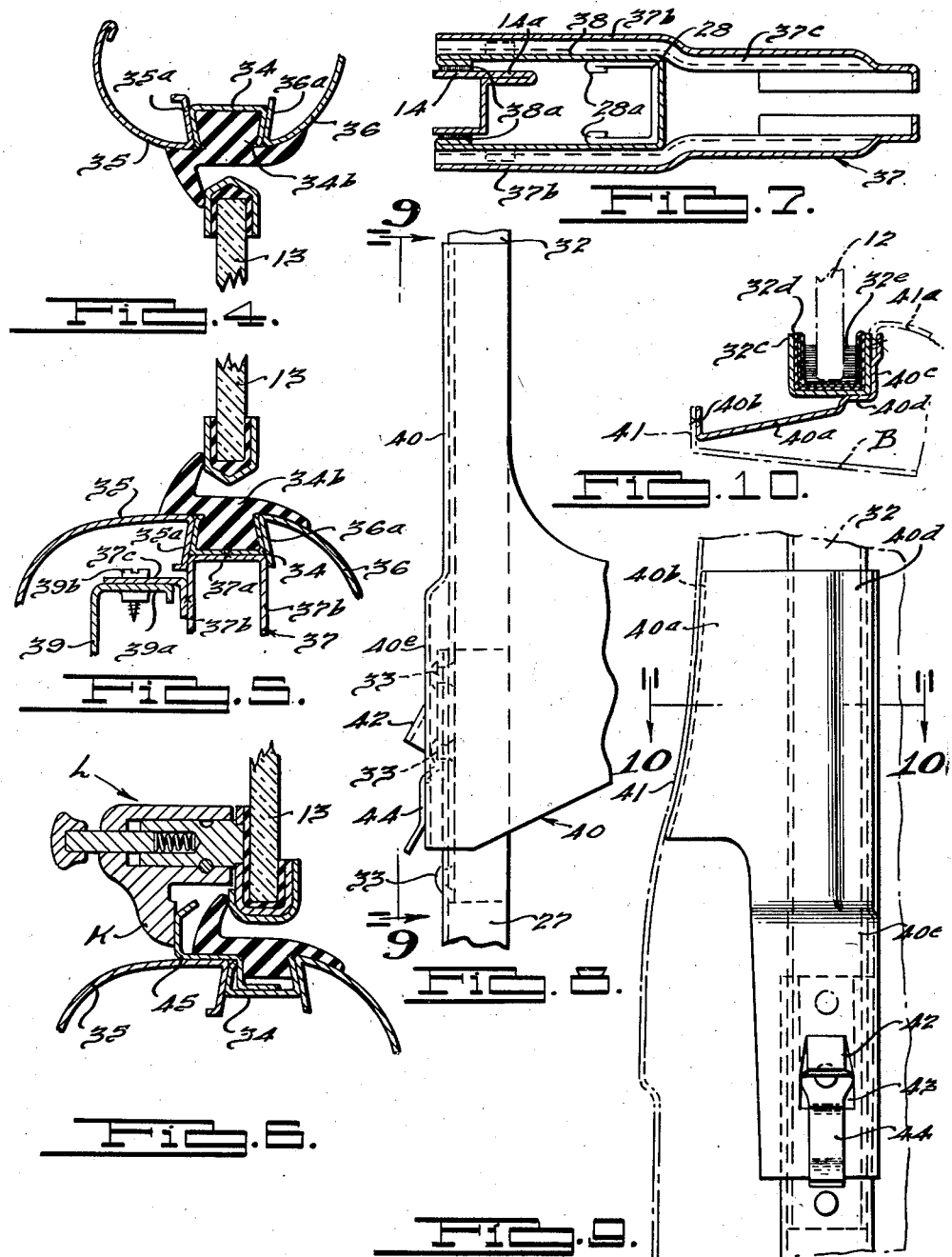

Oct. 31, 1944.  C. B. DOTY  2,361,609
WINDOW ASSEMBLY FOR VEHICLE BODIES
Filed Nov. 4, 1941  4 Sheets-Sheet 4
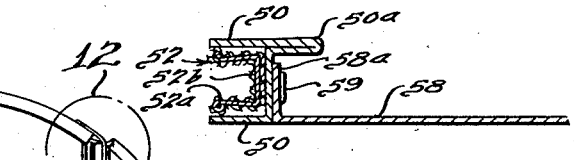
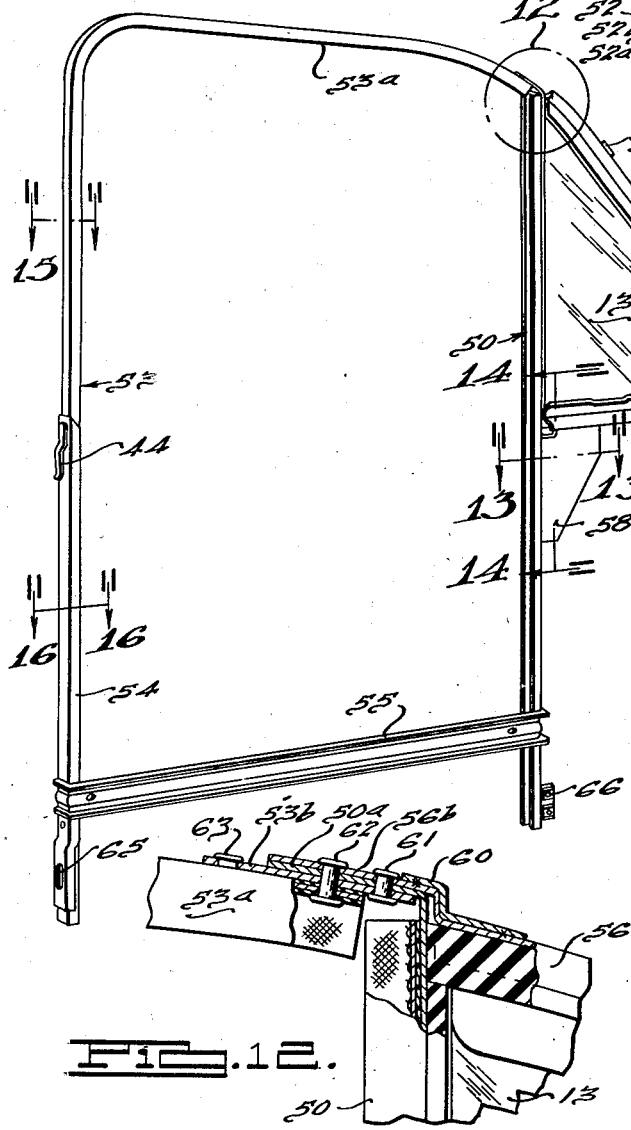
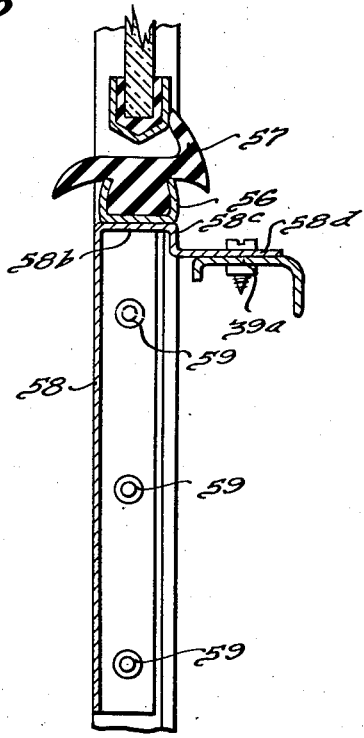
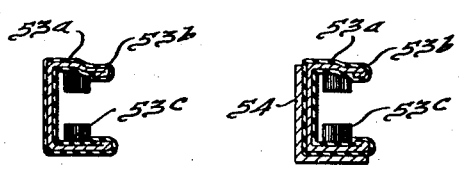
INVENTOR
Clifford B. Doty.
BY Gray and Smith
ATTORNEYS.

Patented Oct. 31, 1944

2,361,609

UNITED STATES PATENT OFFICE 2,361,609

WINDOW ASSEMBLY FOR VEHICLE BODIES

Clifford B. Doty, Detroit, Mich., assignor to Briggs Manufacturing Company, Detroit, Mich., a corporation of Michigan Application November 4, 1941, Serial No. 417,817

12 Claims. (Cl. 296—44)

This invention relates to devices for guiding and controlling glass or transparent panels of windows, particularly windows of automobiles, in which the transparent panels or panes are adapted to be raised and lowered, usually through the medium of some suitable regulator mechanism operable from the inside of the automobile body. The invention is particularly useful for guiding and controlling the vertically slidable transparent panels of a window which also embodies a pivoted transparent panel cooperable with the sliding panel in its fully raised position to close the window opening.

In conventional assembly of the two window panels of the above type considerable difficulties have been encountered in production to insure a lining up of the guides not only vertically or in an up and down direction but also in a longitudinal plane so as to avoid cramping or binding of the glass when it is raised and lowered. Also difficulties have been encountered in lining up the sliding panel and wing panel so that when fully closed, the adjacent edges will meet and no crack or gap will be produced between the adjacent edges resulting from improper relative positions of the guides. It has been the practice in connection with many automobiles to install the sliding window and its guides or glass run channels separately from the wing and this has been done on the main assembly line. After assembly of the sliding panel and its guides or glass run channels, it has been the practice to install the wing panel with its frame in connection with the installation of the garnish molding. According to one conventional practice the marginal frame carrying the pivoted wing panel has been attached permanently to the garnish molding and this unit has been installed after the inner door trim panel has been secured in position. This has been necessitated owing to the fact that the garnish molding had to be installed after the door trim panel since the lower edge of the garnish molding overlaps the upper edge of the trim panel. By proceeding in this manner it will be readily seen that if the forward vertical guide for the sliding panel is not positioned properly with respect to the rear vertical edge of the wing panel, then when the sliding panel is closed a gap may be formed between the adjacent edges of the panels. Adjustment of the guide in order to line up the adjacent edges of the sliding and wing panel has been difficult in view of the fact that access to the interior of the door cannot be obtained without removing the door trim panel and, therefore, without removing the garnish molding which carries the wing panel.

It is an object of the invention to provide a unitary window guide and frame assembly particularly adapted for the front doors of automobiles which have a vertically slidable window panel and an adjacent or forwardly located pivoted glass wing.

It is another object of the invention to provide a window guide and a frame assembly unit of the foregoing type, which unit includes the entire guiding means for the sliding panel, the entire supporting means for the wing panel, and means for attaching said guiding means and supporting means together to form a single unitary frame within which both glass panels are installed before reaching the assembly line, thus insuring a lining up of the sliding panel and the wing panel so that when the window opening is fully closed the adjacent edges of said panels will meet properly and no crack or gap will be produced therebetween.

A further object of the invention is to provide a unitary window guide and frame adapted to be fabricated as a sub-assembly or bench assembly unit comprising the wing panel and its supporting frame and the guides for the sliding panel, which unit may be quickly and readily installed in the door at the main assembly line where the door trim panel and the garnish molding are installed.

Another object of the invention is to provide improved means for guiding and controlling a vertically slidable panel during its upward and downward movements so that the panel will travel more easily and with less frictional resistance while at the same time it will be held firmly in substantially all positions, thereby minimizing any tendencies of the panel to tilt or bind in the guides when the panel is raised and lowered.

Another object of the invention is to provide a unitary window guide and frame assembly particularly adapted for the front doors of automobiles which have a vertically slidable window panel and an adjacent or forwardly located pivoted glass wing, which unit comprises forward and rear guide channels secured together within the window well, a relatively rigid glass run channel having a rear vertical portion attached at its lower end to or forming a continuation of the rear channel guide and having a generally horizontal portion attached at its forward end to a supporting frame for the wing panel, the sliding panel being adapted to travel along the forward and rear guide channels within the window well, a dividing bar secured to the forward edge of the sliding glass panel against which the rear edge of the wing panel seats when the window is in a fully closed position, and a bracket securing the wing supporting frame to the forward guide channel.

A further object of the invention is to provide a unitary window guide and frame assembly of the foregoing type, which guide comprises a forward and a rear guide channel secured together at their lower portion within the window well, the rear guide channel comprising a relatively rigid glass run channel extending from the window frame into the window well, the forward guide channel forming a part of a permanently attached dividing bar which extends within the window well, a sliding panel engaging the front and rear guide channels in its upward and downward movement in and out of the window opening, a supporting frame for the wing panel attached at its upper rear portion to a forwardly extending portion of the glass run channel and to the upper end of the dividing bar, and a bracket rigidly securing the wing supporting frame at its lower rear portion to the dividing bar, thus providing a unit in which not only the sliding panel is properly lined up in a vertical direction but in which adjacent edges of the sliding glass panel and the wing panel will properly meet.

Other objects of this invention will appear in the following description and appended claims, reference being had to the accompanying drawings forming a part of this specification wherein like reference characters designate corresponding parts in the several views.

Fig. 2 is a perspective view of an embodiment of the invention.

Fig. 3 is a perspective view of a sliding glass panel showing a dividing bar attached thereto and one form of guide devices for assisting in guiding the panel.

Fig. 4 is an enlarged section view taken substantially through lines 4—4 of Fig. 1 looking in the direction of the arrows.

Fig. 5 is an enlarged sectional view taken substantially through lines 5—5 of Fig. 1 looking in the direction of the arrows.

Fig. 6 is an enlarged sectional view taken substantially through lines 6—6 of Fig. 1 looking in the direction of the arrows.

Fig. 7 is an enlarged sectional view taken substantially through lines 7—7 of Fig. 1 looking in the direction of the arrows.

Fig. 8 is an enlarged fragmentary elevation view of the guide structure shown in Fig. 1.

Fig. 9 is an enlarged fragmentary sectional view, partly in elevation, taken substantially through lines 9—9 of Fig. 8 looking in the direction of the arrows.

Fig. 10 is an enlarged sectional view taken substantially through lines 10—10 of Fig. 9 looking in the direction of the arrows.

Fig. 11 is a perspective view of a second embodiment of the invention.

Fig. 12 is an enlarged fragmentary detail view of the parts located substantially within the area of circle 12 of Fig. 11.

Fig. 13 is an enlarged sectional view taken substantially along lines 13—13 of Fig. 11 looking in the direction of the arrows.

Fig. 14 is an enlarged sectional view, partly in elevation, taken substantially through lines 14—14 of Fig. 11 looking in the direction of the arrows.

Fig. 15 is an enlarged sectional view taken substantially along lines 15—15 of Fig. 11 looking in the direction of the arrows.

Fig. 16 is an enlarged sectional view taken substantially through lines 16—16 of Fig. 11 looking in the direction of the arrows.

Figure 1:
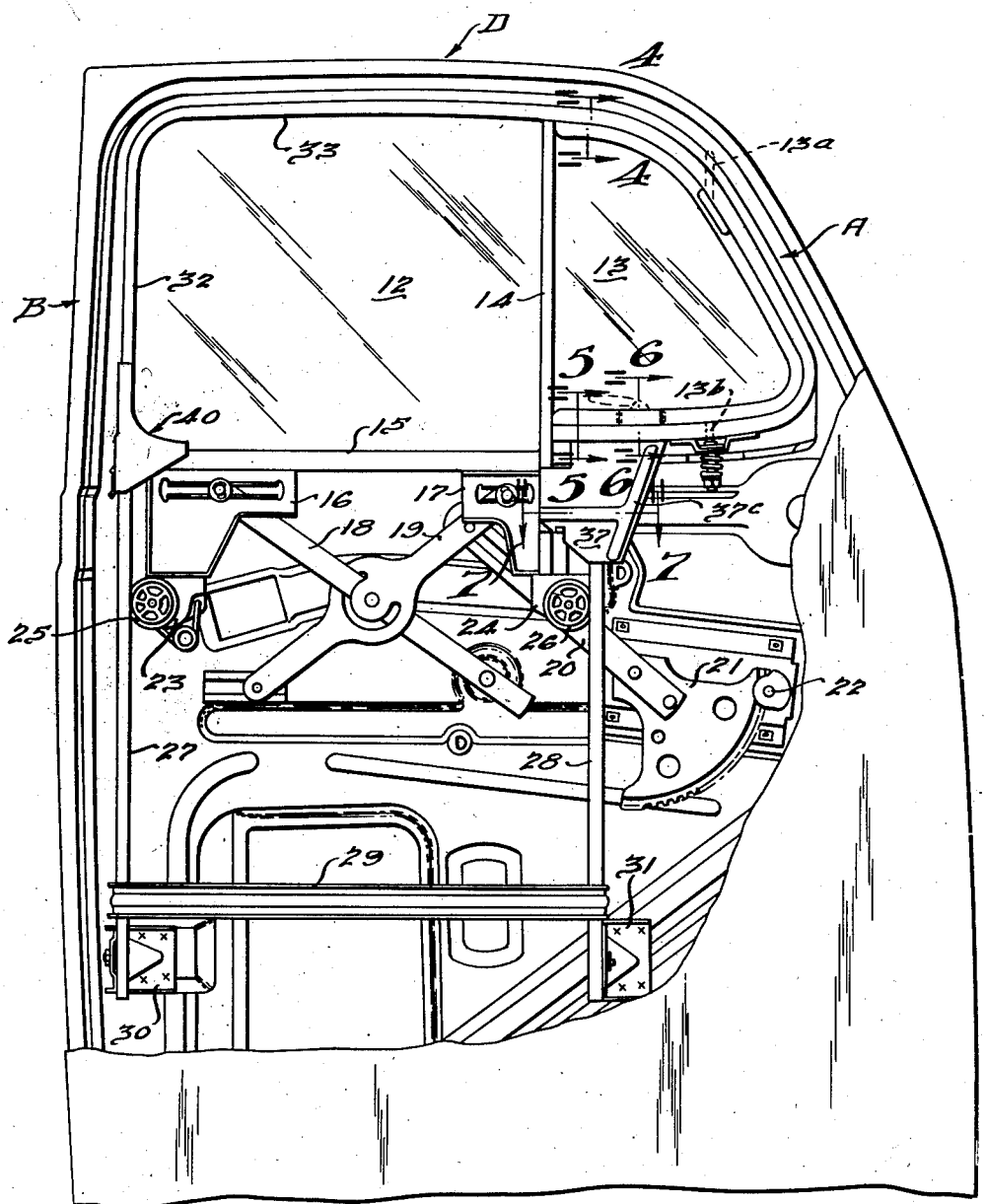
Fig. 1 is an inner fragmentary side elevation, partly broken away, of an automobile door embodying the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In Fig. 1 there is illustrated an automobile door which may be a front door D including a front sloping pillar A and a rear upright pillar B. The upper portion of the door is provided with a main window opening adapted to be closed by means of a vertically slidable glass or other transparent panel 12 and a laterally swinging glass or transparent panel 13. In the present instance the panel 13, which is of the so-called wing type, is disposed at the forward part of the window opening and the panels are preferably arranged so that when in fully closed position they extend in the same or in substantially parallel planes and cooperate together to close the main window opening. The wing type panel may be pivoted at points 13a and 13b so as to swing laterally about an up and down axis. Secured to the forward upright edge of the sliding glass 12 is a channel or dividing bar 14 which at its inner side has a forwardly projecting lip or overlap flange 14a against which the rear edge of the wing seats when the window is in a fully closed position. In the illustrated embodiment the dividing guide or bar 14 slides up and down with the sliding panel in and out of the window opening and well.

Secured to the lower edge of the glass panel 12 is a channel bar or glass retainer member 15 which substantially at each of its ends is provided with depending bracket members 16 and 17 to which the outer ends of suitable regulator arms 18 and 19 are operably attached. The regulator is shown as of the cross arm type, one arm thereof being attached to a suitable driving arm 20, which driving arm, secured to a gear section 21, is in turn driven by a pinion 22 on a handle shaft which includes a conventional friction clutch and crank handle at the outer end thereof. It will be understood that the invention may be adapted for use with any suitable type of regulator other than the one shown and that the regulator described in connection with Fig. 1 is merely shown for the purposes of illustration.

The brackets 16 and 17 carry at their lower flanged edges two channel shaped brackets 23 and 24 which are adapted to accommodate spring pressed rollers 25 and 26 forming guide devices which engage the spaced parallel edges 27a and 28a of a pair of similar upright channel guides 27 and 28. The channel guides 27 and 28 are secured together adjacent their lower ends by a laterally extending tie bar 29 and are adjustably mounted within the window well of the door or body to angle brackets 30 and 31 which in turn are secured to the inner surface of the inner door panel. The guide devices 25 and 26 preferably travel along the edges of the channel guides and spring suspend the glass panel 12 within the window well. In the illustrated embodiment the bar 14 is secured to the glass 12 and has a depending portion or extension 14b fastened to the forward vertical edge of the bracket 17.

The sliding panel 12 is guided within the window opening by means of a relatively rigid glass run channel 32 which has sufficient flexibility to permit it to be bent on a curve around the upper rear corner of the window frame. Preferably the glass run channel 32 as shown in Fig. 10 is in the form of a thin metal channel 32c preferably completely encased in rubber 32d bonded to the inner and outer surfaces thereof. The inner surfaces of the flanges of the channel carry a fibrous pile fabric or felt 32e adapted to engage and cushion the side edges of the glass panel 12.

The glass run channel 32 has an upper generally horizontal portion 32a and a rearward generally vertical portion 32b which telescopes into the upper end of the rear channel guide 27 and is secured thereto by means of rivets or studs 33. The forward end of the generally horizontal portion 32a telescopes into and is secured by means of rivets or studs or the like to a marginal channel shaped rigid support frame 34 of the wing panel 13. The support frame 34 is generally U-shaped in construction and nests between inturned flanges 35a and 36a of the garnish molding and the outer door panel 35 and 36 respectively, being further secured by means of tabs or small brackets 34a to the inner edges of the sloping pillar A of the door D. As illustrated, the wing panel 13, which is pivoted at 13a and 15b to the supporting frame 34, is encased at its forward generally sloping edges with a rigid metal binder 35. The usual rubber or resilient sealing strip 34b is inserted within the channel of the frame 34 to effectively seal the window opening when the wing panel 13 is fully closed.

An inverted U-shaped bracket 37 having a base or web portion 37a and downwardly extending flanges 37b is spot welded to the bottom of the supporting frame 34 at its rear lower portion and extends downwardly into the window well. As shown in Fig. 5 the bracket 37 is attached to the inner door panel by means of an angle bracket 37c. One flange of this bracket is spot welded to flange 37b of bracket 37 and the other flange is secured by means of screw 39b to the upper outturned flange 39a of the inner door panel 39. The bracket 37 is provided on each of its sides or flanges 37b with a generally T-shaped ribbed or embossed portion 37c to lend strength to the bracket. The bracket 37 as shown in Fig. 7 is wide enough to receive a short vertical channel guide 38 which is spot welded to the inner surfaces of the bracket. This relatively short channel guide is deep enough to receive along its base portion the upper end of the forward guide channel 28 which is telescoped thereinto and secured by spot welding. Rearwardly of the channel guide 28 the wide short channel 38 is provided with felted portions 38a which engage and guide the dividing bar 14 which in turn is secured to the edge of the sliding panel 12. It will be seen, therefore, that when the sliding glass is raised and lowered the guiding bar 14 will be guided and held against transverse movement by guide portions 38a and at the same time the glass will be guided by the rollers 26 travelling along the edges 28a of the channel guide 28.

It will be noted that the wing supporting frame 34 is held in properly fixed relation to the front guide channel 28 by the inverted U-shaped bracket 37. Also that the position of the glass run channel 32 to the sliding glass 12 is predetermined by its connection at the forward end of the horizontal portion 32a to the wing supporting frame 34 and its rearward vertical portion 32b to the rear channel guide 26. Also it will be seen that the correct positions of the channel guides 27 and 28 will be predetermined by the rigid tie bar 29. Thus, a unitary assembly unit as shown in Fig. 2 is provided which, with the sliding panel 12 installed therein, may be assembled in the door as a unit.

A generally channel shaped corner brace or bracket 40 is vertically positioned at the rear edge of the door adjacent the lower rear corner of the window opening and extends partially within the window well. As shown more particularly in Figs. 8, 9 and 10, the support or bracket 40 is in the form of a channel having a generally outwardly sloping base portion 40a and inwardly extending parallel flanges 40b and 40c. The bracket 40 is secured within the door through the medium of flanges 40b and 40c which are spot welded to flanges 41 and 41a of the door pillar B. The base 40a of the bracket is provided along its upper portion with an inwardly extending embossment 40d forming, as shown in Fig. 10, a seat for the glass run channel 32. The base of the bracket 40 is further provided with an outwardly bulged portion 40e which is provided with an inclined channel shaped pilot member 42 at the upper end of a substantially rectangular slot 43.

At its upper end the upright channel guide 27 is provided on the outer surface of its base, substantially in the central part thereof, with a downwardly extending resilient clip or tongue member 44. The tongue 44 is secured to the channel guide 27 by the rivets or studs 33 which also secure the lower portion of the glass run 32 to the upper portion of the channel guide 27. During installation of the window guide unit the latter is shifted downwardly into the well with the guides 27 and 32 lying within the bracket 40. During this operation the clip or hook 44 engages the pilot member 42, enters through the rectangular slot 43, coming to rest against the lower edge of slot 43. Thus, the connected guide 27, 32 is hooked into the bracket 40 and is held thereby in proper guiding position against relative movement. It will be seen that the entire assembly unit may be quickly and easily installed in the door and attached quickly within the window frame of the door and also within the window well which lies between the inner and outer door panels. This operation only requires the attachment of brackets or clips 34a by screws to the front door pillar, the hooking of hook or tongue 44 in position, the attachment of bracket 37 to the inner door panel at 39b, and the attachment of the lower ends of guides 27 and 28 by screws to brackets 30 and 31.

The wing panel 13 may be secured into a locked position through the medium of any suitable latching device such as illustrated in Fig 6. As shown, the latching device L is of the conventional type well known in the art and is secured to the wing panel 13 by a well known manner. The latching mechanism L is provided with a handle having a cam K which engages a stop member 45 having angularly formed portions resting upon the garnish molding 35 and secured within the wing supporting frame 34.

There is illustrated in Fig. 11 a second embodiment of the invention in which the sliding glass is not guided by the use of roller guide devices but instead is guided at both upright edges into and out of the window well by glass run channels. In this embodiment a rigid channel shaped dividing bar 50, lying between the sliding glass panel and the wing panel 13, extends permanently within the window opening and also within the window well where it serves as a rigid supporting member for a guide or glass run channel 52.

This channel 52 is inserted within the channel shaped dividing bar 50, as shown in Fig. 13, and is supported thereby, and is in the form of a thin metal channel 52a completely encased in a fabric or other suitable material 52b which engages and cushions the side edges of the glass panel. The rear guide for the rear upright edge of the glass comprises a glass run channel 53 which is in the form of a thin metal channel 53a completely encased in rubber 53b bonded to the inner and outer surfaces thereof. The inner surfaces of the flanges of the channel carry a fibrous pile fabric or felt 53c which also engages and cushions the side edges of the glass panel. It is to be noted in this embodiment that the glass runway channel 53 extends down into the window well the full distance of travel of the glass. Within the well, however, it is rigidly supported or stiffened by an upright angle bar 54, see Fig. 16, which in turn is tied to the guide channel 50 by means of a bottom tie bar 55 spot welded thereto. The bar 50 is similar to bar 29 and functions to hold the guides 50 and 53—54 in predetermined spaced positions so that when the unit is installed in the door the guides will automatically assume their correct positions.

The glass run channel 53 is provided with an upper generally horizontal portion 53a which is secured at its forward end to the upper end of the dividing bar 50 and to the rear upper portion of a generally U-shaped wing supporting frame 56. The supporting frame 56 is adapted to receive the pivotally mounted wing panel 13 and is provided with brackets 56a, similar to brackets 34a, for attachment within the door frame. To effect the above connection between parts 53a, 50 and 56, as illustrated in Fig. 12, the portion 53a of the glass run channel is provided with a forwardly extending rigid bar or plate 53b, secured thereto by a rivet or stud 63. The bar or plate 53b underlies and is secured by rivets or studs 61 and 62 to a flanged extension 50a of the dividing bar 50, which extension in turn underlies and is secured by rivets 61 and 62 to a rearwardly projecting flange 56b of the channel supporting frame 56. It is to be noted that the rivets 61 and 62 are employed to secure all of the parts together, rivet 62 extending into engagement directly with the metallic portion 53a of the glass run channel 53. An angle strap or piece 60 is spot welded to the outer surfaces of the flange 56b to add strength to the connection. A resilient sealing strip 57 is secured within the channel wing supporting frame 56 to effectively seal the window opening when the wing 13 is in a closed position. The dividing bar 50 is provided with a forwardly projecting lip or overlap flange 50a against which the rear edge of the wing seats when the window is fully closed.

The wing supporting frame 56 is secured at its lower rearward portion to the lower extension of the dividing bar 50 by a rigid angle bracket 58. This bracket is provided at its rearward edge with an inturned flange 58a secured to the base of the dividing bar 50 by rivets 59, see Fig. 13. Along its upper edge the bracket 58 is provided with an inturned flange 58b which is spot welded to the bottom of the wing supporting frame 56, see Fig. 14. The flange 58b terminates in a depending portion 58c and an inwardly extending flange extension 58d which is attached by a screw to the flange 39a of the inner door panel 39. A hook or tongue 44, similar to that previously described, is riveted to the upper end of the angle bar 54 and as in the previous embodiment is utilized for attaching the guide frame to the bracket 40.

Thus, as in the first embodiment, the entire guiding means for the sliding panel and the entire supporting means for the wing panel are attached together in the form of a single unitary frame within which both glass panels are installed before reaching the assembly line. This entire assembly unit may be readily installed in the door and attached quickly within the window frame and well of the door. The second embodiment differs from the first embodiment principally in that the front upright channel guide 50 is extended from the well through the window opening and is rigidly connected at its upper end to the meeting ends of the wing supporting frame 56 and the upper glass run channel 53a at the junction thereof. It also differs in that the glass run channel 53 extends down into the well and is supported and stiffened by the upright angle bar 54 which in turn is rigidly tied to the front upright guide 50 by means of the bottom tie bar 55.

With the sliding glass panel 12 installed within the guides 50 and 53, and the wing panel 13 installed within the frame 56, it will be seen that the entire unit may be attached within the door substantially in the same manner as described in connection with the previous embodiment. The hook 44 is hooked into the slot 43 of bracket 40, the bracket pieces or tabs 56a are screwed to the front pillar of the door frame, the bracket 58 is attached by screw 58d to the upper flanged edge of the inner door panel, and the lower ends of guide members 54 and 50 are adjustably secured to the inner door panel in the lower part of the well. For this latter purpose the bar 54 has at its lower end a slot 65 by which it may be adjustably fastened by a screw to bracket 30 on the inner door panel. Channel guide 50 in turn has spot welded thereto at its lower end a bracket 66 which may be adjustably secured by screws to the inner door panel.

I claim:

1. A unitary window panel supporting and guiding frame adapted to be installed as a single unit in a vehicle door having inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a bar rigidly connecting the lower ends of said guides, a wing supporting frame within which a wing panel is pivotally mounted, said frame having its upper end permanently attached to the forward end of said upper portion of the rear guide, a bracket rigidly connecting the lower rear portion of said frame to the front guide, devices on said frame and rear guide for attaching the unit to the door prior to installation of the garnish molding, a member fixed to the bracket and extending laterally to overlie the upper flanged edge of the inner door panel below the garnish molding, and means for fastening said member to said flanged edge independently of the garnish molding.

2. A unitary window panel supporting and guiding frame adapted to be installed as a single unit in a vehicle door having inner and outer door panels, a window opening and a well therebelow; comprising forward and rear upright guides adapted to guide a sliding window panel for up and down movement, both of said guides extending into the well, said rear guide having an upright portion adapted to extend along the rear edge of the window opening and an upper longitudinal portion extending along the top edge thereof, a bar rigidly connecting the lower ends of said guides, a wing supporting frame within which a wing panel is pivotally mounted, said frame having its upper end permanently attached to the forward end of said upper portion of the rear guide, a dividing bar secured to the upright edge of said sliding panel adjacent the pivoted panel, a U-shaped bracket rigidly connecting the lower rear portion of said frame to the forward guide, said bracket having spaced side walls adapted to engage the sides of said dividing bar to support the same therein at points rearwardly of the forward guide against transverse movement during the up and down movement of the sliding panel, and means for attaching the unit to the door when installed therein as a unit.

3. A unitary window panel supporting and guiding frame adapted to be installed as a single unit in a vehicle door having inner and outer door panels, a window opening and a well therebelow; comprising forward and rear upright guides adapted to guide a sliding window panel for up and down movement, both of said guides extending into the well, said rear guide having an upright portion adapted to extend along the rear edge of the window opening and an upper longitudinal portion extending along the top edge thereof, a bar rigidly connecting the lower ends of said guides, a wing supporting frame within which a wing panel is pivotally mounted, said frame having its upper end permanently attached to the forward end of said upper portion of the rear guide, a dividing bar secured to the upright edge of said sliding panel adjacent the pivoted panel, a bracket rigidly connecting the lower rear portion of said frame to the forward guide, said bracket having means embracing and guiding said dividing bar rearwardly of the forward guide against transverse movement during the up and down movement of the sliding panel, and means for attaching said frame and guides to the door when installed therein as a unit.

4. A unitary window panel supporting and guiding frame adapted to be installed as a single unit in a vehicle door having inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a bar rigidly connecting the lower ends of said guides, a wing supporting frame within which a wing panel is pivotally mounted, said frame having its upper end permanently attached to the forward end of said upper portion of the rear guide, a bracket rigidly connecting the lower rear portion of said frame to the front guide, and means for attaching said frame and guides to the door prior to installation of the garnish molding, a member fixed to the bracket and extending laterally to overlie the upper flanged edge of the inner door panel below the garnish molding, and means for fastening said member to said flanged edge independently of the garnish molding.

5. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a wing supporting frame within which a wing panel is pivotally mounted, means for permanently attaching the meeting ends of said longitudinal portion and the frame, a bracket permanently attaching the frame and the forward upright guide, means permanently connecting the lower ends of the guides within the window well, a member fixed to the bracket and extending laterally therefrom for positioning the bracket with respect to the upper edge of the inner door panel and secured thereto below and independently of the garnish molding, means for detachably connecting the rear guide to the rear pillar, and means for attaching the edge of the frame to the front door pillar.

6. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a wing supporting frame within which a wing panel is pivotally mounted, means for permanently attaching the meeting ends of said longitudinal portion and the frame, a bracket permanently attaching the frame and the forward upright guide, means permanently connecting the lower ends of the guides within the window well, a member fixed to the bracket and extending laterally therefrom for positioning the bracket with respect to the upper edge of the inner door panel and secured thereto below and independently of the garnish molding, a hook for detachably connecting the rear guide to the rear pillar, and brackets for attaching the edge of the frame to the front door pillar.

7. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a wing supporting frame within which a wing panel is pivotally mounted, said frame having its upper end permanently attached to the forward end of said upper portion of the rear guide, a bracket for permanently attaching the frame and the forward upright guide, means permanently connecting the lower ends of the guides within the window well independently of the door, and means for positioning said bracket, rear guide and frame with respect to the door independently of the garnish molding and prior to the installation of the latter, said means including a member fixed to the bracket and extending laterally in overlapping relation to the upper edge of the inner door panel below the garnish molding and secured to said edge.

8. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising two longitudinally spaced upright guides adapted to guide a sliding window panel for up and down movement, both of said guides extending into the well and the rear guide having an upright portion adapted to extend along the rear edge of the window opening and an upper longitudinal portion extending along the top edge thereof, a wing supporting frame, a wing panel pivotally mounted therein, said frame having its upper end permanently attached to the forward end of said upper portion of the rear guide, a bracket permanently attaching the frame and the forward upright guide, a tie bar rigidly connecting the lower ends of the guides together in spaced relation, and means for positioning said unit within the door and attaching the same to the door independently of the garnish molding and prior to the installation of the latter, said means including a member fixed to the bracket and extending laterally in overlapping relation to the upper edge of the inner door panel below the garnish molding and secured to said edge.

9. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising front and rear upright guides adapted to extend into the well for guiding a sliding window panel for up and down movement, a wing supporting frame, a wing panel pivotally mounted therein, the rear upright guide being extended upwardly along the rear edge of the window opening and thence forwardly along the upper edge thereof, the upper end of the wing supporting frame being permanently attached to the forward end of said guide extension, and means permanently attaching the lower portion of said frame to the front upright guide, said means being attachable to the inner door panel independently of the garnish molding, and including a bracket member fixed to the front guide and extending laterally in overlapping relation to the upper flanged edge of the inner door panel below the garnish molding and secured to said flanged edge.

10. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising front and rear upright guides adapted to extend into the well for guiding a sliding window panel for up and down movement, a wing supporting frame within which a wing panel is adapted to be pivotally mounted, the rear upright guide being extended upwardly along the rear edge of the window opening and thence forwardly along the upper edge thereof, the upper end of the wing supporting frame being permanently attached to the forward end of said guide extension, means for attaching the lower portion of said frame to the front upright guide, means for rigidly connecting the lower ends of said guides together in spaced relation, and means for positioning said unit in the door and securing the same in position independently of the garnish molding and prior to installation of the latter, said means including a bracket member fixed to the front guide and extending laterally to overlie the upper edge of the inner door panel below the garnish molding and secured to said edge.

11. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising front and rear upright guides adapted to extend into the well for guiding a sliding window panel for up and down movement, the rear guide comprising a flexible glass run channel, a wing supporting frame within which a wing panel is adapted to be pivotally mounted, the rear upright guide being extended upwardly along the rear edge of the window opening and thence forwardly along the upper edge thereof, a rigid upright angle bar supporting the lower portion of said rear guide within the window well, the upper end of the wing supporting frame being permanently attached to the forward end of said guide extension, means for attaching the lower portion of said frame to the front upright guide, means for rigidly connecting the lower ends of said angle bar and front guide together in spaced relation, and means for positioning said unit in the door and attaching the same to the door independently of the garnish molding and prior to installation of the latter, said means including a bracket member fixed to the front guide and extending laterally to overlie the upper edge of the inner door panel below the garnish molding and secured to said edge.

12. A unitary window panel supporting and guiding frame adapted to be installed as a single unit in a vehicle door having front and rear pillars, inner and outer door panels, a window opening, a well therebelow and a garnish molding adapted to extend around the margin of said opening; comprising front and rear upright guides adapted to extend into the well for guiding a sliding window panel for up and down movement, a wing supporting frame within which a wing panel is adapted to be pivotally mounted, the rear upright guide being extended upwardly along the rear edge of the window opening and thence forwardly along the upper edge thereof, said front upright guide being extended upward into the window opening adjacent the rear edge of the wing panel when said panel is in a closed position, the upper end of the wing supporting frame being permanently attached to the forward end of said guide extension and to the upper end of said front upright guide, means for attaching the lower portion of said frame to the front upright guide, means for rigidly connecting the lower ends of said guides together in spaced relation, and means for attaching said unit to the door free of the garnish molding and prior to installation of the latter, said means including a bracket member fixed to the front guide and extending laterally to overlie the upper edge of the inner door panel below the garnish molding and secured to said edge.

CLIFFORD B. DOTY.